United States Patent

Yasuda et al.

[11] Patent Number: 6,015,511
[45] Date of Patent: Jan. 18, 2000

[54] METHOD FOR PRODUCING AN INTRAOCULAR LENS

[75] Inventors: Akihiro Yasuda; Kazuharu Niwa, both of Kasugai, Japan

[73] Assignee: Menicon Co., Ltd., Nagoya, Japan

[21] Appl. No.: 09/150,902

[22] Filed: Sep. 10, 1998

[30] Foreign Application Priority Data

Sep. 12, 1997 [JP] Japan .................................... 9-248261

[51] Int. Cl.⁷ ...................................................... B29D 11/00
[52] U.S. Cl. ............................................. 264/1.7; 264/2.7
[58] Field of Search ........................... 264/1.1, 1.7, 1.36, 264/1.38, 2.7

[56] References Cited

U.S. PATENT DOCUMENTS

| | | | |
|---|---|---|---|
| 4,540,532 | 9/1985 | Petcen et al. ............................. | 264/1.1 |
| 5,037,435 | 8/1991 | Chang et al. ............................. | 264/1.7 |
| 5,182,053 | 1/1993 | Creaseman et al. ..................... | 264/1.7 |
| 5,217,491 | 6/1993 | Vanderbilt ................................ | 264/1.7 |
| 5,246,634 | 9/1993 | Ichikawa et al. ........................ | 264/2.7 |
| 5,582,778 | 12/1996 | Sherwood et al. ...................... | 264/1.7 |
| 5,762,836 | 6/1998 | Bos et al. ................................. | 264/1.7 |

Primary Examiner—Mathieu D. Vargot
Attorney, Agent, or Firm—Oblon, Spivak, McClelland, Maier & Neustadt, P.C.

[57] ABSTRACT

An intraocular lens of one-piece body consisting of supporting portions 34 and an optical portion 32 is formed by forming an annular supporting-portion-forming blank 2 composed of a polymerization product for supporting portion 34, which has a thickness to form the supporting portion 34 for an intraocular lens and has a through hole 4 formed by concentrically drilling the central portion on the basis of the outer diameter of the blank; forming a composite-lens-forming blank 24 by filling in the through hole a monomer composition 16 for forming another polymerization product 22 for the optical portion followed by polymerizing it whereby the polymerization product 22 is formed integrally in the through hole; and processing the blank 24 on the basis of its outer diameter.

17 Claims, 5 Drawing Sheets

FIG. 3a
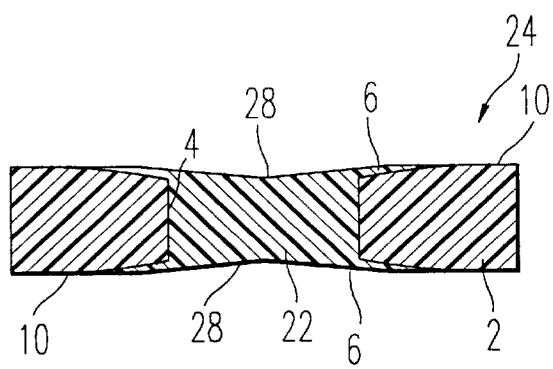
FIG. 3b
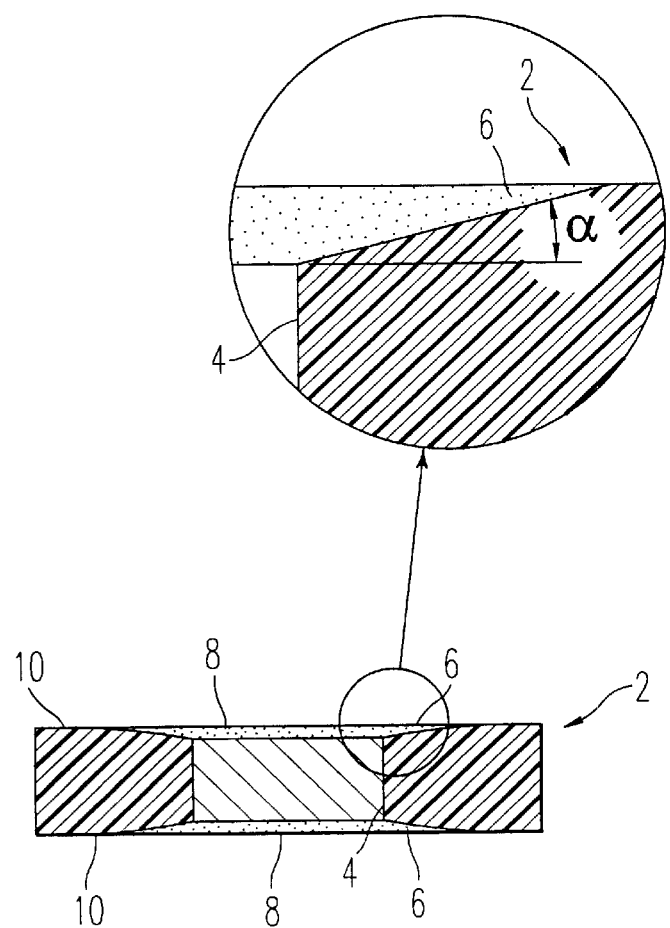
FIG. 3c

METHOD FOR PRODUCING AN INTRAOCULAR LENS

The present invention relates to a method for producing an intraocular lens. More particularly, it relates to a one-piece type intraocular lens comprising an optical portion composed of a first polymerization product and a supporting portion composed of a second polymerization product different from the first polymerization product wherein the supporting portion is formed integrally with the optical portion at its outer circumferential portion.

BACKGROUND OF THE INVENTION

Generally, an intraocular lens is constituted by an optical portion as a lens body having a high refractive index and a supporting portion capable of securing the optical portion at a predetermined position in an eye. There have been known a three piece type or two piece type intraocular lens wherein the optical portion is prepared separately from the supporting portion which is fixed to the optical portion in the post-treatment, and a one piece type (an integral type) intraocular lens wherein the optical portion is formed integrally with the supporting portion.

In any type of intraocular lens, the optical portion should be formed from material composed of a predetermined polymerization product having excellent optical properties, and the supporting portion should be formed from the material composed of a predetermined polymerization product having properties suitable for supporting the optical portion in an eye, respectively. For this, there has been considered an intraocular lens wherein different polymerization products are used for the optical portion and the supporting portion. For example, an intraocular lens capable of being folded wherein a cut portion in a cornea in inserting operations of the lens is minimized as possible, has been proposed. In the proposed intraocular lens, a polymerization product is used for forming the optical portion which is soft and can be folded, and another polymerization product is used for forming the supporting portion which is hard and has a sufficient rigidity to support the optical portion in an eye. Further, there has been proposed that the optical portion is formed by a transparent material (a first polymerization product) and the supporting portion is formed by a colored material (another polymerization product) so that the position of the supporting portion can easily be confirmed when the intraocular lens is inserted in an eye. For the integral type (i.e., the one piece type) intraocular lens wherein the optical portion is formed integrally with the supporting portion, however, it was difficult to employ straightly such proposed technique, and it was difficult to form only the optical portion by a soft material capable of being folded or to form only the supporting portion by a colored material.

Japanese Unexamined Patent Publication JP-A-4-295353 describes a method for producing an intraocular lens capable of being folded. Namely, a polymerization product for forming a soft optical portion capable of being folded is first formed by polymerization. Then, a round rod-like optical material is formed by processing an outer diameter portion of the polymerization product. The rod-like optical material is placed in a suitable tubular polymerization vessel and another polymerization product, which is different from the first polymerization product, for forming a hard supporting portion is formed by polymerization around the first polymerization product to thereby form an integral composite material. The composite material is processed to obtain a composite-lens-forming blank for forming a single intraocular lens. Then, the composite-lens-forming blank is processed to prepare a one piece type intraocular lens.

In the above-mentioned technique that a predetermined monomer composition for forming the polymerization product for the supporting portion is polymerized around the round rod-like optical material to form the integral composite material, however, it was difficult to keep the round rod-like optical material at the center of the vessel during polymerization. Further, in such composite material in which the supporting-portion-forming material is formed integrally around the optical-portion-forming material due to the polymerization of the monomer composition for supporting portion, a uniform outer diameter could not be obtained due to polymerization shrinkage whereby there causes misalignment between the center of the optical-portion-forming material and the outer diameter of the composite material.

Accordingly, when the ordinary lens processing operations such as shaving, cutting and so on are conducted to the thus obtained composite material to prepare intraocular lenses, the position of connection between the optical portion and the supporting portion varies for individual intraocular lenses and homogeneous products can not be obtained. Further, in a typical intraocular lens in which two supporting portions are symmetrically formed to the optical portion, the two connecting portions between the optical portion and the two supporting portions are deviated from the symmetric position with respect to the center of the optical portion whereby reactions of the supporting portions against an external force are different at both sides of the intraocular lens. The supporting portions of the intraocular lens are adapted to press the capsule in a crystal lens capsule to fix the optical portion to the center of the lens. Accordingly, when the two supporting portions have different reactive forces at the both sides of the optical portion, the function of the intraocular lens is greatly reduced.

Japanese Unexamined Patent Publication JP-A-2-7954 discloses a method for producing an one-piece type intraocular lens having a supporting portion composed of a colored material (a polymerization product). In this method, a rod-like composite material is first produced by forming a colored polymerization product for forming the supporting portion around a transparent optical-portion-forming blank for an optical portion by post-polymerization in the same manner as that disclosed in the above-mentioned JP-A-4-295353 publication. Further, the center of the colored rod-like material of colored polymerization product is perforated by a drill or the like to form an elongated tubular supporting-portion-forming blank. Then, a monomer composition for optical portion is filled in the drilled central opening of the blank followed by polymerizing the monomer composition whereby a composite material in which a transparent polymerization product for forming the optical portion is integrally formed in the central opening is produced. Then, the obtained composite material is cut out to obtain a composite-lens-forming blanks having a predetermined thickness. Each of the blanks is processed to obtain each intraocular lens.

However, the later method wherein the optical portion is formed by the post-polymerization raised several problems. Namely, when the monomer composition for producing the optical portion is filled for polymerization in the central opening of the elongated tubular supporting-portion-forming blank to formed the polymerization product for forming the optical portion, polymerization shrinkage takes place and air bubbles are generated, or an integral structure of the supporting-portion-forming blank and the polymerization product for forming the optical portion at the interface between the inner face of the central opening of the blank and the polymerization product is not sufficiently provided whereby there causes a defect of releasing and so on. Therefore, it was very difficult to obtain a rod-like composite material having a uniform integral structure in its longitudinal direction. In a case of cutting-out a composite-lens-forming blank having a predetermined thickness from such rod-like composite material, it was very difficult to obtain a useful composite-lens-forming blank in which the polymerization product for forming the supporting portion was formed integrally with the polymerization product for forming the optical portion.

BRIEF SUMMARY OF THE INVENTION

It is an object of the present invention to provide a method for producing a one-piece type (an integral type) intraocular lens having an integral structure of an optical portion and a supporting portion whereby generation of air bubbles in a polymerization product for the optical portion produced by post-polymerization and a defect of releasing or the like at the contact interface between the polymerization product for the supporting portion and the polymerization product for the optical portion can effectively be suppressed, and occurrence of misalignment in the optical portion is minimized.

In accordance with the present invention, there is provided a method for producing a one-piece type intraocular lens comprising an optical portion composed of a first polymerization product and a supporting portion composed of a second polymerization product different from the first polymerization product, the supporting portion being formed integrally with the outer periphery of the optical portion, characterized by comprising:

a step of forming an annular supporting-portion-forming blank composed of the second polymerization product, which has a thickness to form the supporting portion for an intraocular lens and has a through hole formed by concentrically drilling the central portion on the basis of the outer diameter of the blank; a step of forming a composite-lens-forming blank by filling in the through hole of the supporting-portion-forming blank a monomer composition for forming the first polymerization product, followed by polymerizing whereby the first polymerization product is formed integrally in the through hole of the supporting-portion-forming blank; and a step of forming a one-piece type intraocular lens by processing the composite-lens-forming blank on the basis of its outer diameter so that the supporting portion is formed from a portion corresponding to the supporting-portion-forming blank in the composite-lens-forming blank, and the optical portion is formed from the first polymerization product formed in the through hole, which has been drilled in the supporting-portion-forming blank, in the composite-lens-forming blank.

In the above-mentioned method for producing an intraocular lens, the annular supporting-portion-forming blank having a through hole formed correctly at its central portion, which is formed by drilling concentrically the central portion on the basis of the outer diameter of the blank, is used. Further, the composite-lens-forming blank is formed by polymerizing a monomer composition as a first polymerization product for forming the optical portion in the central through hole. Accordingly, the material for the optical portion (the first polymerization product) polymerized in the through hole of the supporting-portion-forming blank is correctly positioned at the central portion with respect to the outer diameter of the supporting-portion-forming blank, namely, it is positioned concentrically to the supporting-portion-forming blank. Accordingly, when the composite-lens-forming blank is processed to obtain a lens on the basis of the outer diameter, an intraocular lens free from misalignment of the optical portion, i.e., without a shift of position in the joint portion between the optical portion and the supporting portion, is obtainable.

Further, in the present invention, when the material for the optical portion (the first polymerization product) is formed integrally by post-polymerization, it is not necessary to use the conventional elongated tubular supporting-portion-forming material, but the annular supporting-portion-forming blank having a thickness capable of forming a supporting portion for a single intraocular lens is used. Then, the monomer composition as the first polymerization product for forming the optical portion is filled in the through hole formed at the central portion of the blank in a minimum necessary amount, i.e., an amount necessary for producing the optical portion constituting a single intraocular lens. Thus, the absolute amount of polymerization shrinkage resulted by the polymerization of the monomer composition is decreased whereby generation of air bubbles and a defect of releasing at the contact interface can effectively be controlled. On the other hand, in a method for obtaining a number of composite-lens forming blanks, having a step of forming the first polymerization product by polymerizing a predetermined monomer composition in the central opening of an elongated tubular supporting-portion-forming material having a substantial length in its axial direction, the first polymerization product for forming the optical portions is formed by polymerization in a long tubular vessel having a confined periphery. Accordingly, there occurs a large amount of polymerization shrinkage which is difficult to absorb whereby the problems such as air bubbles or releasing takes place.

In the present invention, it is preferable for the supporting-portion-forming blank to use the supporting-portion-forming material composed of the second polymerization product which is cut out to have a size capable of producing a plurality of supporting portions for a plurality of intraocular lenses. In this case, productivity and uniformity of the intraocular lenses are increased.

The method of the present invention is favorably applicable to a method of producing an intraocular lens capable of being folded. In this case, the first polymerization product provides a soft optical portion capable of being folded, and the second polymerization product provides a hard supporting portion having a sufficient rigidity to support the optical portion in an eye.

According to a preferred embodiment of the method for the producing an intraocular lens of the present invention, the monomer composition for the first polymerization product is filled in the through hole of the supporting-portion-forming blank; opened portions at both ends of the through hole are covered with flexible films so as not to leave air between the monomer composition and the films; and the polymerization of the monomer composition is conducted. Thus, when the opened portions at both ends of the through hole of the supporting-portion-forming blank are covered with films, both surfaces of the monomer composition for the first polymerization product by post-polymerization are covered with the films to seal them from air whereby a problem of the compositional change of the polymerization product due to vaporization of monomers during polymerization or polymerization disturbance of the monomer composition due to contact with air can effectively be eliminated. Further, since a deformation of the films in response to the polymerization shrinkage compensates a reduction of the volume in the axial direction of the through hole, occurrence of air bubbles during polymerization and occurrence of a defect of releasing at the interface can further be decreased.

In such a case of employing the covering structure with films, a space is preferably formed at an opened portion at at least one end of the through hole of the supporting-portion-forming blank to cause the deformation of the film in response to the polymerization shrinkage of the monomer composition for the first polymerization product. The space is formed at the opened portion at each end of the through hole of the supporting-portion-forming blank. More advantageously, the total volume of the space is 5% or more of the volume of the through hole of the supporting-portion-forming blank. The formation of the space facilitates the deformation of the films in response to the polymerization shrinkage whereby the problem of generation of air bubbles or releasing can further be avoided.

According to a preferred embodiment of the present invention, the space may be formed at an opened portion at an end of the through hole of the supporting-portion-forming blank in which an outwardly expanding tapered surface is provided. The formation of the space having such tapered surface facilitates the deformation of the film along the tapered surface whereby the film is deformed depending on an amount of the polymerization shrinkage, and the problem of generation of air bubbles or releasing is avoidable. Further, it is preferable for the supporting-portion-forming blank having such tapered surface to have a flat surface contiguous to the tapered surface at a radically outer side. In this case, workability can further be improved.

BRIEF DESCRIPTION OF THE DRAWINGS

In drawings:

FIGS. 1a and 1b show an embodiment of a supporting-portion-forming blank used in the present invention wherein FIG. 1a is a plan view and FIG. 1b is a cross-sectional view taken along a line A—A in FIG. 1a;

FIGS. 3a and 3c show more specifically the supporting-portion-forming blank shown in FIGS. 1a and 1b wherein FIG. 3a is a cross-sectional view showing the supporting-portion-forming blank and a first polymerization product formed in the through hole of the blank in which there is a sink mark due to polymerization shrinkage, and FIG. 3b is a diagram for explaining a space formed at opened portions at both ends of the through hole and an angle of a tapered surface;

FIG. 3b is a close-up view of a portion of FIG. 3c.

Figure 1A:
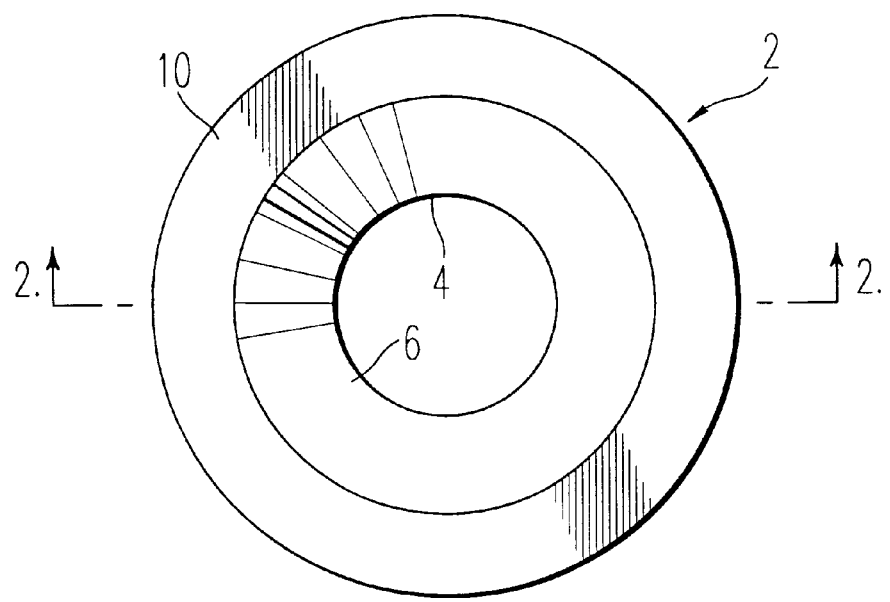

Preferred embodiment of the present invention will be described in more detail.

DETAILED DESCRIPTION OF PREFERRED EMBODIMENTS

When a one-piece type intraocular lens is produced according to the present invention, a first polymerization product for forming an optical portion and a second polymerization product for forming a supporting portion to be formed integrally with an outer circumferential portion of the optical portion of the intraocular lens should be different in terms of material, physical or physical chemistry from the second polymerization product depending on required characteristics of an intraocular lens as the final product. Such first and second polymerization products are suitably selected from the various known monomers. Further, two kinds of monomer composition in which a suitable formulating ingredient is added, may be used.

Monomers constituting such monomer compositions, are suitably selected from various known monomers which have been commonly employed for the production of intraocular lenses, and they may, for example, be straight chain, branched chain or cyclic alkylacrylates or methacrylates, silicon-containing acrylates or methacrylates, styrene or its derivatives, aromatic ring-containing acrylates or methacrylates, fluorine-containing styrene derivatives, vinylbenzyl fluoroalkyl ethers, N-vinyl lactams, hydroxyl group-containing acrylates or methacrylates, acrylic acid or methacrylic acid, acrylamide or methacrylamide or derivatives thereof. Further, a cross-linking agent having at least two polymerizable group (unsaturated bonds) in its molecule, may also be used as a constituting component of the monomer composition, like in the conventional composition.

When an intraocular lens capable of being folded to which the present invention is advantageously applied is produced, the first polymerization product is selected from the above-mentioned known monomers so as to form a soft optical portion of high refractive index which is capable of being folded. For example, the first polymerization product can be formed by polymerizing a monomer composition including monomers such as hydroxyethyl methacrylate, phenoxyethyl acrylate or the like as the major component. On the other hand, the second polymerization product can be formed by polymerizing a monomer composition including monomers such as methylmethacrylate or the like as the major component so as to form a hard supporting portion which has a sufficient rigidity to support the optical portion in an eye.

In the present invention, the monomer compositions for the first and second polymerization products may be constituted by different kinds of monomer. Further, they may be constituted by using the same monomer. In this case, the formulation is changed or a formulation ingredient such as a coloring agent is added to form polymerization products of different properties. Thus, the present invention is usefully applicable to the method of producing an intraocular lens comprising the optical portion and the supporting portion which are formed by different polymerization products having different properties.

When a one-piece type intraocular lens is produced by using two different kinds of monomer composition, an annular supporting-portion-forming blank is first produced which is composed of the second polymerization product for forming the supporting portion of the intraocular lens and which has a thickness to form the supporting portion for a single intraocular lens in which a central opening is formed by perforating concentrically the central portion on the basis of the outer diameter.

Explanation will be made in more detail with reference to FIGS. 1a, 1b and 2.

Figure 1B:
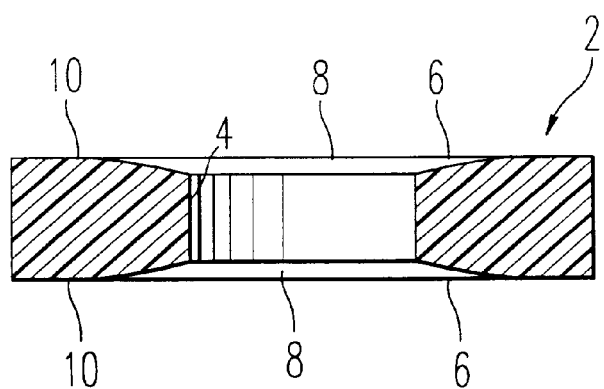

In FIGS. 1a and 1b, an annular supporting-portion-forming blank 2 composed of the second polymerization product is subjected to processing so that an outer diameter (generally, about 13–20 mm) necessary and enough to form the supporting portion for the intraocular lens is formed accurately. Then, on the basis of the correctly processed outer diameter or outer circumferential surface, a boring or drilling operation is conducted to perforate a central portion of the blank concentrically whereby a through hole 4 having about 4–8 mm in diameter is formed concentrically in the supporting-portion-forming blank 2. The blank 2 is formed to have an annular shape or a doughnut-like shape. The supporting-portion-forming blank 2 is processed to have a thickness, e.g., about 0.3–3 mm, to form the supporting portion for a single intraocular lens. Further, tapered surface 6, 6 are formed at both ends of the through hole 4 so as to extend outwardly from through hole 4 whereby spaces 8,8 are formed at opened portions at both ends in the axial direction of the through hole 4. A flat surface 10 having a predetermined with is formed at each end in the axial direction of the supporting-portion-forming blank 2 where the tapered surface 6 is formed. The flat surface is contiguous to the tapered surface 6 at a radially outer side.

Figure 2:
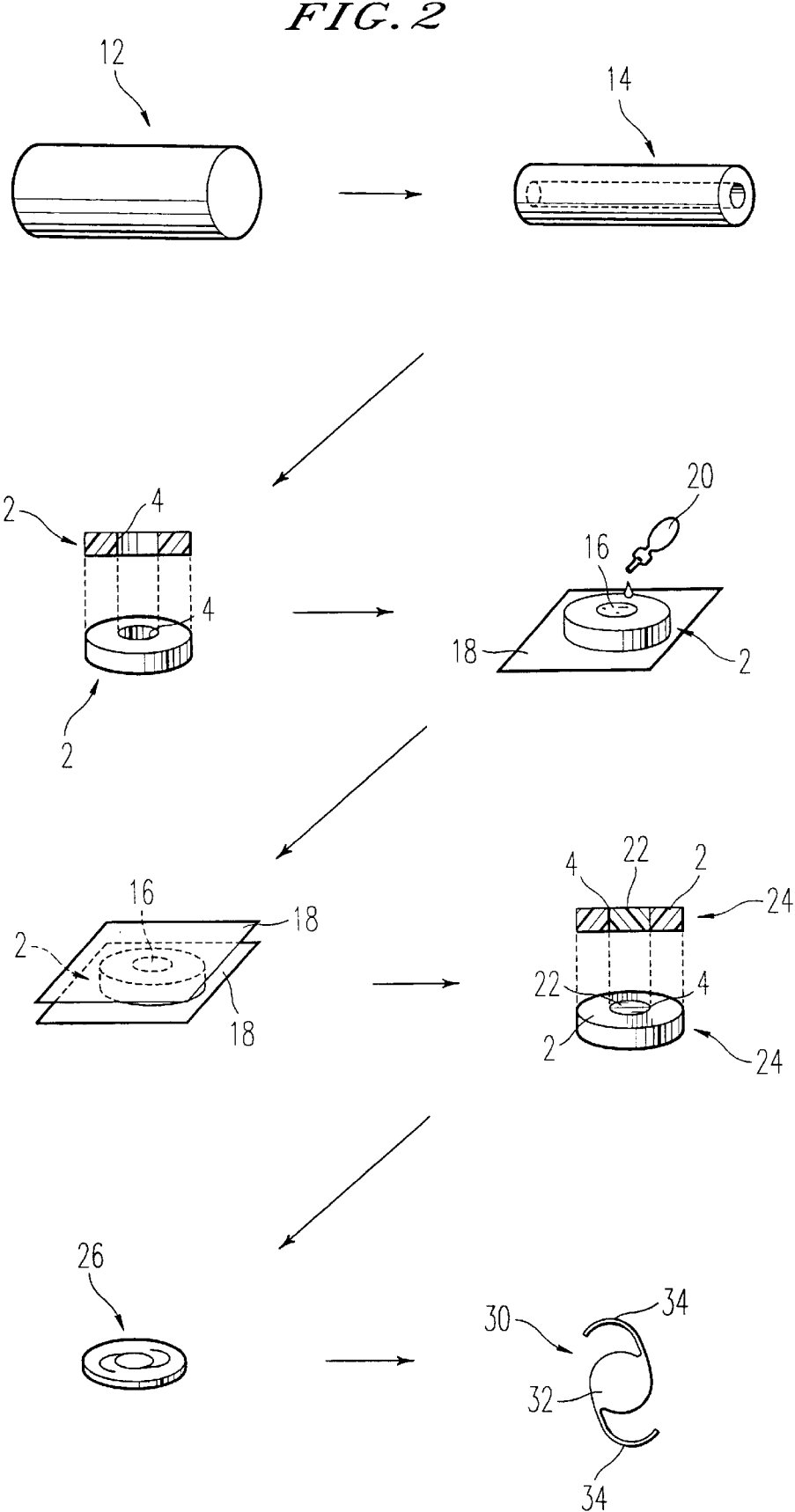
FIG. 2 is a diagram showing steps of producing an intraocular lens according to an example of the present invention.

The supporting-portion-forming blank is formed as shown in FIG. 2, for example. Namely, a monomer composition including monomers such as methylmethacrylate as the major component is polymerized by conventional procedure to form an elongated rod-like supporting-portion-forming material 12 as the second polymerization product. Thus obtained material 12 is subjected to precise processing to its outer circumferential portion followed by perforating to thereby form an elongated tubular material 14 from which a plurality of supporting-portion-forming blanks are produced by cutting out. Then, the blank material 14 is cut perpendicularly to its axial direction to have a thickness for forming the supporting portion for a single intraocular lens. Thus, the supporting-portion-forming blank 2 having the through hole 4 which is formed concentrically at its central portion can be obtained. The elongated tubular blank material 14 from which a plurality of supporting-portion-forming blanks 2 are cut out or the elongated rod-like supporting-portion-forming material 12 as the raw material for the blank material 14 should have a size (in its axial direction) to form a plurality of supporting portions for a plurality of intraocular lenses from the standpoint of productivity and uniformity of the supporting-portion-forming blanks 2. In the present invention, such supporting-portion-forming material 12 or the blank material 14 is preferably used and a plurality of supporting-portion-forming blanks 2 as the object are formed.

The present invention includes a method for producing a plurality of supporting-portion-forming blanks 2 from a flat plate-like supporting-portion-forming material 12 having a large surface area which has a thickness to form each supporting portion for each single intraocular lens besides the case as shown in FIG. 2 wherein an elongated rod-like supporting-portion-forming material 12 is used to form a plurality of supporting-portion-forming blanks 2. Further, the present invention includes an embodiment that a supporting-portion-forming material 12 having a size to form a supporting portion for a single intraocular lens from which a single supporting-portion-forming blank 2 is formed. Further, the blank 2 composed of the second polymerization product may be formed by injection-molding.

The supporting-portion-forming material 12 for the supporting-portion-forming blank 2 is formed by polymerizing a monomer composition including at least one kind of monomers suitably selected from known monomers by conventional procedure in a suitable tubular polymerization vessel such as a test tube. For such monomer composition, a predetermined polymerization initiator is added depending on an employable polymerizing operation. For example, when a heat polymerization is conducted, a radical polymerization initiator such as azobisisobutylonitrile, azobisdimethylvaleronitrile or the like is formulated. When photopolymerization is conducted, a photopolymerization initiator such as benzoin, methylolsobenzoilbenzoate is formulated. Further, a polymerizing method in combination of heat polymerization and photopolymerization can be employed.

Then, a composite-lens-forming blank is produced in the method of the present invention. As described above, the monomer composition including monomers as the major composition suitably selected from known monomers is filled in the through hole 4 formed in the supporting-portion-forming blank 2 to form the first polymerization product for forming the optical portion of an intraocular lens. The monomer composition is polymerized by the conventional procedure, e.g., a known polymerization method such as heat polymerization or photopolymerization whereby the first polymerization product is formed integrally with the supporting-portion-forming blank. In this case, flexible films 18 are used to cover opened portion at both ends of the through hole 4 of the supporting-portion-forming blank 2 so that any does not remain between the films and the filled monomer composition, in other wards, the films are in contact with the filled monomer composition, and then, the monomer composition 16 is polymerized.

The above-mentioned technique will be described in more detail. In a state that the supporting-portion-forming blank 2 is placed on a film 18, the monomer composition 16 for optical portion is injected in the through hole 4 by using a syringe 20 until the through hole 4 is filled with the monomer composition. Then, another film 18 is placed to cover the opened portion at an upper side of the through hole of the blank 2 so that the film contacts the liquid level of the monomer composition. Namely, the both opened portions at both ends of the through hole 4 are closed by the upper and lower films 18, 18, i.e., the monomer composition 16 filled in the through hole 4 is covered in its vertical direction with the films 18, 18. If necessary, glass plates are used to clamp the films 18, 18 from the outside in order to conduct polymerization operations such as heat polymerization. Thus, a composite-lens-forming blank 24 in which a first polymerization product 22 of the monomer composition formed integrally in the through hole 4 of the supporting-portion-forming blank 2 can be obtained.

In the composite-lens-forming blank 24 thus obtained, the polymerization of the monomer composition 16 for producing the first polymerization product 22 for the optical portion is conducted in the through hole 4 formed in the supporting-portion-forming blank 2 having a thickness necessary to form a single intraocular lens so that the first polymerization product 20 is integral with the blank 2. Accordingly, an amount of the polymerization shrinkage can effectively be reduced in comparison with the conventional technique wherein an elongated tubular body is used and polymerization is conducted in the followed opening whereby a plurality of lens blanks are produced. According to the steps shown in FIG. 2, problems of generation of air bubbles in the first polymerization product 22 and generation of releasing at the interface between the first polymerization product 22 and the supporting-portion-forming blank 2 can effectively be suppressed.

Further, by covering the surfaces of the monomer composition 16 filled in the through hole 4 of the supportingportion-forming blank 2 with the films 18 in the polymerization of the monomer composition 16 for forming the first polymerization product 22 for the optical portion, the films 18 are deformed in response to the polymerization shrinkage to thereby effectively suppress disadvantages of generation of air bubbles in the first polymerization product 22 and a defect of releasing and so on. Further, problems such as evaporation of monomers and polymerization disturbance due to air during the polymerization can be avoided by the films 18 as a covering material. Any material may be used for the films 18 unless the material is eroded by the monomer composition 16 and it is stable to heat during the polymerization. However, in order to follow the polymerization shrinkage, a film having an elongation in tension of 10% or more is suitable. Specifically, the films 18 may be of polyesters such as polyethylenetelephtalate, resins such as polypropylene, polyethylene, silicone or the like.

The thus obtained composite-lens-forming blank 24 is processed on the basis of its outer diameter. The supporting portion is formed from a portion corresponding to the supporting-portion-forming blank in the composite-lens-forming blank 24 and the optical portion is formed from the first polymerization product 22 formed in the through hole 4 so as to be integral with the supporting-portion-forming blank 2 in the composite-lens-forming blank 24 respectively. Thus, a one-piece type intraocular lens is produced. In this case, processing of the lens portion is conducted according to the conventional technique.

Specifically, the composite-lens-forming blank 24 is held by a suitable jig to process a specified surface so that a back face side of the optical portion for an intraocular lens is formed from the portion of the first polymerization product 22 in the composite-lens-forming blank 24 and a back face side of the supporting portion is formed from the portion of the supporting-portion-blank 2 respectively. Further, numerical processing is conducted for relief engraving or trimming of an outer configuration of the intraocular lens (optical portion and supporting portion) (vide, JP-A-5-161666) to thereby produce a back face-processed product (a semi-finished product) 26. Then, the back face side of the back face-processed product 26 is adhered and fixed to a jig by using a suitable adhesive agent, and processing is conducted to a front face side of the complex-lens-forming blank 24 in which there are the portion corresponding to the first polymerization product 22 of the blank 24 and the portion corresponding to the supporting-portion-forming blank 2 of the blank 24. When the processing is finished, the processed product is removed from the jig and finishing operations such as cleaning, polishing are conducted whereby a one-piece type intraocular lens 30 as shown in FIG. 2 is produced.

In the obtained intraocular lens 30, two curved supporting elements 34, 34 are formed integrally with the outer periphery of a lens portion 32 as the optical portion. The optical portion 32 and the supporting elements 34 are correctly formed from the portion corresponding to the first polymerization product 22 and the portion corresponding to the supporting-portion-forming blank 2 of the composite-lens-forming blank 24 without causing any deviation at the joints between the optical portion 32 and the supporting elements 34. It is because the through hole 4 is correctly formed concentrically with respect to the outer diameter of the supporting-portion-forming blank 2, and therefore, the first polymerization product 22 formed in the through hole 4 is completely concentric to the supporting-portion-forming blank 2. Accordingly, when back face processing, NC engraving and front face processing are conducted on the basis of the outer diameter of the composite-lens-forming blank 24, the optical portion 32 and the supporting elements 34 can correctly be formed in the portions corresponding to the first polymerization product 22 and the supporting-portion-forming blank 2. Thus, such collect arrangement of the supporting elements 34 to the optical portion 32 provides a uniform support to the optical portion 32. In a case that the supporting elements 34, 34 are provided at two positions as shown in FIG. 2, there is no possibility that repulsive forces of the supporting elements 34, 34 against external forces are different at joints to the optical portion 32 whereby the optical portion 32 can be maintained at the center with respect to the supporting elements 34, 34.

In the above-mentioned method for producing an intraocular lens according to the present invention, it is desirable to form a space 8 having a predetermined size at an opened portion of at at least an end of the through hole 4 in the annular supporting-portion-forming blank 2. Such space 8 facilitates the follow-up movement of the film 18 covering a surface of the monomer composition 16 depending on an amount of the polymerization shrinkage of the monomer composition 16 in the through hole 4 whereby generation of air bubbles and generation of releasing at the interface can effectively be suppressed.

FIG. 3a shows that sink marks are produced due to the polymerization shrinkage of the monomer composition in the composite-lens-forming blank 24 obtained by using the supporting-portion-forming blank 2 shown in FIG. 1. The sink marks are provided as slight recesses 28 at a central portion of upper and lower surfaces of the first polymerization product 22 according to the follow-up of the film 18 due to the presence of the space 8, and the sink mark does not generate air bubbles in the first polymerization product 22 or does not result a defect of releasing or the like at the interface between the inner surface of the through hole 4 and the outer surface of the first polymerization product 22.

When spaces 8 are formed at both sides in the axial direction of the supporting-portion-forming blank 2, the total volume of the spaces 8 should be 5% or more, preferably 20% or more, or more preferably, 30% or more than the volume (a cross-hatching region) of the through hole 4 shown in FIG. 3b whereby the sink mark due to the polymerization shrinkage can effectively be absorbed. Further, when the space 8 is formed by a tapered surface 6 as shown in FIG. 3b, an inclination angle a of the tapered surface 6 should generally be in a range of 1°–80°, preferably, 1°–20°, more preferably, 3°–15°. The width of a flat surface 10 which is contiguous to an outer side in the radial direction of the tapered surface 6 should be in a range of about 0.5–8 mm. The flat surface 10 blocks entering of air bubbles when the film 18 is covered on the blank 2; facilitates the processing to the tapered surface 6, and makes measuring of the thickness of the supporting-portion-forming blank 2 easy.

The above-mentioned space 8 is preferably provided at the opened portion at both ends in the axial direction of the through hole 4 rather than the case that it is provided at only one end. When the spaces 8 are formed at both ends, recesses due to the polymerization shrinkage can further effectively be absorbed. Although the spaces 8 are desirably formed around an outer portion of the opened portion of the through hole 4 and have tapered surfaces 6 expanding outwardly, various shapes of space 8 can be formed at the opened portions in the axial direction of the through hole 4 so as to make the follow-up of the film 18 easy depending on an amount of the polymerization shrinkage.

Figure 4A:
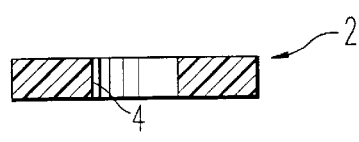
FIGS. 4a to 4d are cross-sectional views showing various kinds of supporting-portion-forming blank used in the present invention.
Figure 4B:
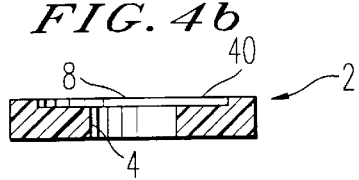
Figure 4C:
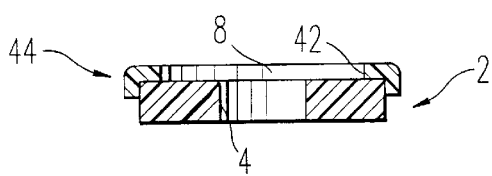

FIGS. 4a to 4d show several examples of forming the space 8. A stepped portion 40 having a predetermined depth is formed at the opened portion at an end in the axial direction of the through hole 4 (FIG. 4b) by processing the supporting-portion-forming blank 2 without having any space as shown in FIG. 4a. In FIG. 4c, a cap member 44 having a larger opening 42 than the through hole 4 is fitted to an end side of the supporting-portion-forming blank 2 whereby the space 8 can be provided by the opening 42. In the supporting-portion-forming blank 2 shown in FIG. 4d, a tapered surface 6 as shown in FIG. 1 is formed at an opened portion at an end side of the through hole 4 to provide the space 8 there.

Figure 5A:
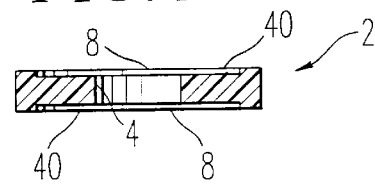
FIGS. 5a and 5b are cross-sectional views of two supporting-portion-forming blanks used in the present invention.
Figure 5B:
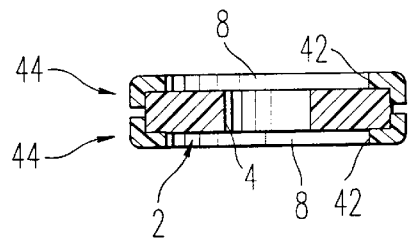

FIGS. 5a and 5b separate embodiments of the supporting-portion-forming blank 2 wherein spaces 8 are formed at opened portions at both ends in the axial direction of the through hole 4. In more detail, in the embodiment shown in FIG. 5a, the same stepped portion 40 as in FIG. 4b is formed at the opened portion at each side of the through hole 4. Further, in the embodiment shown in FIG. 5b, the same cap member 44 having an opening 42 as shown in FIG. 4c is fitted to each side of the through hole 4 whereby spaces 8 are formed at both sides of the through hole 4.

Figure 6A:
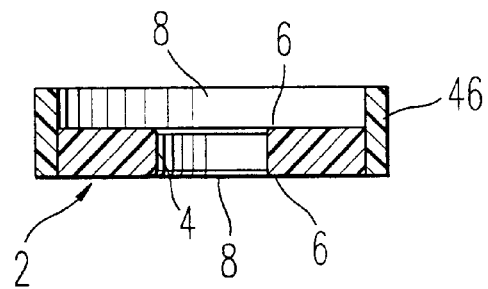
FIGS. 6a to 6c are cross-sectional views of various kinds of supporting-portion-forming blank used in the present invention.
Figure 6B:
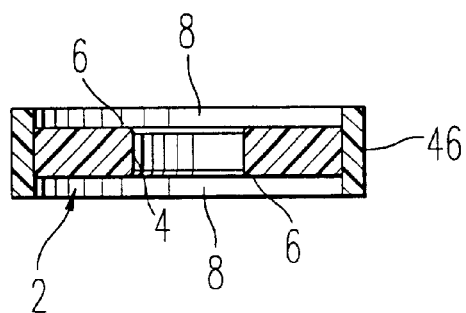
Figure 6C:
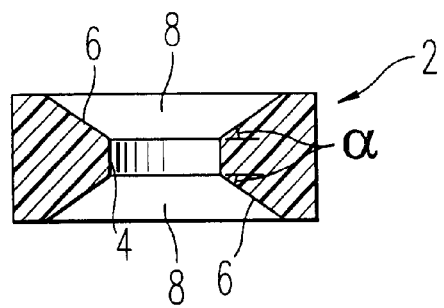

FIGS. 6a to 6c show embodiments having a larger space 8 than that in the supporting-portion-forming blank 2 shown in FIG. 1. In the embodiment in FIG. 6a, a tubular body 46 having a thickness larger than that of the supporting-portion-forming blank 2, i.e., a larger length in the axial direction than that of the blank 2, is fitted to an outer periphery of the blank 2 whereby a larger space 8 is formed by a portion of the tubular body 46 projecting upwardly from the blank 2 and the tapered surface 6 at a side of the through hole 4 while a space 8 provided by only the tapered surface 6 is formed at the other side of the through hole 4. In an embodiment shown in FIG. 6b, a tubular body 46 is fitted to an outer periphery of the supporting-portion-forming blank 2 to project beyond upper and lower surfaces of the blank 2 by a predetermined length whereby larger spaces 8, 8 are formed by the projections and the tapered surfaces 6 at both sides in the axial direction of the through hole 4. In an embodiment shown in FIG. 6c, tapered surface 6, 6 are formed at both sides in the axial direction of the through hole 4 wherein each inclination angle of tapered surface is increased whereby each space 8 provided by such tapered surface 6 is increased. When the inclination angle α is increased, the thickness of the supporting-portion-forming blank 2 (a length in the axial direction) is naturally thick (large).

As described above, it is preferable that the space 8 is formed at at least one end, preferably both ends of the through hole 4 of the supporting-portion-forming blank 2, and further, it is preferable that the space 8 is provided by forming the tapered surface 6. However, the space 8 may be formed without forming the tapered surface 6. For example, it may be provided with a stepped recess such as the stepped portion 40 or an arched recess. In the above-mentioned method for producing an intraocular lens, description has been made as to forming two supporting elements having the shape as illustrated. However, supporting elements having another shape may be used for the intraocular lens. Further, the number of the supporting elements 34 is not limited to two but may be a single or three or more number.

EXAMPLES

Now, the present invention will be described in detail with reference to examples. However, it should be understood that the present invention is by no means restricted by such specific examples, and may be altered or revised based on knowledge of persons in the art.

Example 1

The following is an example for producing a one-piece type intraocular lens according to steps shown in FIG. 2.

99.5 parts by weight of methylmethacrylate, 0.5 parts by weight of butanedioldiacrylate as a cross linking agent and 0.1 parts by weight of azobisisobutylonitrile as a polymerization initiator were uniformly mixed. The mixture was charged into a silicon-coated test tube having an inner diameter of 19.6 mm. After the deoxygenation of the inside of the tube, the opened portion of the test tube was hermetically sealed with a cork. Then, the test tube was heated in a temperature controlled water bath at 35° C. for 40 hours and at 50° C. for 8 hours to accelerate polymerization. Further, the test tube was placed in a hot air circulation type drier in which temperature was increased to 130° C. over 20 hours to complete the polymerization. The polymerization product was removed from the test tube and a straightening operation was conducted by increasing again temperature to 120° C. Thus, a circular rod-like supporting-portion-forming material 12 was obtained. The supporting-portion-forming material 12 was processed to form an elongated tubular material 14, from which several blanks were to be cut out, which had correct outer diameter(15.5 mm) and inner diameter (6.0 mm). From the elongated material 14, a number of supporting-portion-forming blanks 2 of doughnut-like shape having a thickness of 2.5 mm, as shown in FIG. 4a, were cut out.

100 parts by weight of 2-hydroxyethylmethacrylate, 1 part by weight of butanedioldiacrylate as a cross linking agent, 0.2 parts by weight of 2-[2'-hydroxy-5'(2"-methacryloyloxyetoxy)-3'-tert-butylphenyl]-5-methyl-2H-benzotriazole as a polymerizable ultraviolet absorber and 0.1 parts by weight of 2,2'-azobis(2,4-dimethybaleronitrile) as a polymerization initiator were uniformly mixed to prepare a liquid phase monomer composition 16 for the first polymerization product 22 from which optical portions 32 are to be produced.

On a silicone-coated glass plate, a supporting-portion-forming blank 2 was placed, and the prepared monomer composition 16 was filed in the through hole 4. Another silicone-coated glass plate was placed on the blank 2. Upper and lower glass plates were clamped by a binding clip so that air was not present between the glass plates and the monomer composition 16 followed by subjecting the monomer composition 16 to polymerization in the hot air circulation type dryer in which temperature was controlled to 40° C. for 16 hours. After this, temperature was increased to 130° C. over 15 hours to complete the polymerization. Thus, a composite-lens-forming blank 24 in which the first polymerization product 22 was formed integrally in the through hole 4 of the supporting-portion-forming blank 2, was obtained. Further, a number of composite-lens-forming blanks 24 were produced by using other supporting-portion-forming blanks in the same manner as described above. In about a 30% portion of the thus obtained large number of complex-lens-forming blanks 24, there was found that a portion of supporting-portion-forming material (the supporting-portion-forming blank 2) and a portion of optical-portion-forming material (the first polymerization product 22) were completely bonded, and there was found no defect of generation of air bubbles and cracks and no releasing at the interface between the two materials. However, in a remaining about 70% portion, it was found that air bubbles were generated in the portion of optical-portion-forming material (the first polymerization product 22) and releasing at the interface took place.

The composite-lens-forming blanks 24 obtained as non-defective products were processed on the basis of its outer diameter according to the conventional procedure to produce one-piece type intraocular lenses. In more detail, each of the composite-lens-forming blanks 24 was bonded to a rotary jig. Back face shaving was conducted to a side of the blank 24 followed by NC engraving to thereby produce each relief of the optical portion and the supporting portion. Then, the processed back face side of the blank 24 was bonded to another jig and the front face processing was conducted to the other surface, followed by conducting finishing treatments such as cleaning, polishing and so on to thereby obtain a one-piece type intraocular lens 30. In the intraocular lens 30, the optical portion 32 and the supporting elements 34 were correctly formed respectively from the portion corresponding to the first polymerization product 22 and the portion corresponding to the supporting-portion-forming blank 2 which constituted the composite-lens-forming blank 24. There was found no misalignment of position of the joints between the optical portion 32 and the supporting elements 34 and the two supporting elements 34, 34 were completely symmetrical with respect to the center of the optical portion 32. It was confirmed that the symmetrical structure provided a uniform repulsive force against an external force.

Example 2

A supporting-portion-forming blank 2 having a shape as shown in FIG. 4a was prepared and a liquid phase monomer composition 16 for forming the first polymerization product 22 was formulated in the same manner as in Example 1.

A polyethylene terephthalate film (PET film) of 0.1 mm thick was placed on a glass plate and the supporting-portion-forming blank 2 was placed on the film. The monomer composition 16 was charged in the through hole 4 at the center of the blank 2 to completely fill the through hole 4. A PET film having a size of 17 mm×17 mm was overlaid on the opened portion of the through hole 4 while preventing air bubbles from entering. After a glass plate was placed on the overlaid PET film, the upper and lower glass plates were cramped by a binding clip. Then, the monomer composition was polymerized in a hot air circulation type drier at 40° C. for 16 hours. Further, the temperature in the drier was elevated to 130° C. over 15 hours to complete the polymerization whereby a composite-lens-forming blank 24 was obtained. In the same manner as above, a plurality of composite-lens-forming blanks 24 were prepared.

In an about 50% portion of the thus obtained plurality of composite-lens-forming blanks 24, there was found a completely bonding state of the portion corresponding to supporting-portion-forming material (the supporting-portion-forming blank 2) and a portion of optical portion-forming material (the first polymerization product 22) and there was found no defect such as air bubbles, air cracks or the like. However, in a remaining about 50% portion, there was found that air bubbles were generated in the portion of optical-portion-forming material 22) or releasing between the portion 22 and the portion 2. The PET films followed up the polymerization shrinkage of the monomer composition 16 for the optical portion, and the recess was formed at each central portion of the upper and lower surfaces of the portion corresponding to the optical-portion-forming material (the first polymerization product 22).

Example 3–11

The supporting-portion-forming material 12 was produced in the same manner as in Example 1. Shaving and boring operations were conducted to the material 12 to form an elongated tubular material 14 for a correct blanks, which had a correct outer diameter and inner diameter. From the elongated tubular material 14, a plurality of supporting-portion-forming blanks 2 were cut out. Various spaces were formed in the cut-out blanks 2. Namely, in Examples 3–7, supporting-portion-forming blanks having spaces 8 as shown in FIGS. 4b–4d and FIGS. 5a–5b were formed. In Example 8, a supporting-portion-forming blank 2 having spaces 8, 8 provided by tapered surfaces 6, 6 at both end portions of the through hole 4 as shown in FIG. 1 was formed. In Examples 9–11, supporting-portion-forming blanks 2 having spaces 8 as shown in FIGS. 6a–6c were formed. By using the supporting-portion-forming blanks 2 having various shapes of space 8, the monomer composition 16 for optical portion was polymerized to prepare composite-lens-forming blanks 24 in the same manner as Example 2.

The composite-lens-forming blanks 24 prepared according to these examples had large surface areas where the PET films covering the opened portion of the through hole 4 contacted with the liquid phase monomer composition 16 for optical portion, and spaces 8 facilitated the following-up of the PET films 18. The PET films 18 smoothly followed up the polymerization shrinkage, a percentage of rejection of the composite-lens-forming blanks 24 decreased. In case that the spaces were formed at both end portions (upper and lower portions) of the through hole 4, percentage of passing was about 100%. Supporting-portion-forming blanks 2 in examples 6 and 7 wherein the spaces 8 as shown in FIGS. 5a and 5b were formed, air bubbles were apt to remain in the spaces 8 at a bottom side (lower side in the drawings) during the charging of the monomer composition 16. Further, in Examples 8–11, air bubbles were smoothly released to improve workability because the tapered surfaces 6 were formed around the through holes 4.

Example 12

Supporting-portion-forming blanks 2 shown in FIG. 1 were prepared in the same manner as Example 8. Then, a plurality of composite-lens-forming blanks 24 were produced by polymerizing the monomer composition in the same manner as in Example 8 except that the polypropylene (PP) films of 0.2 mm thick were used instead of PET films.

In the production of the composite-lens-forming blanks 24, there was no problem of the following-up of the PP films to the polymerization shrinkage. Further, the obtained composite-lens-forming blanks 24 were free from air bubbles and releasing at the interface and percentage of passing was 100%.

Comparative Example 1

A round rod-like supporting-portion-forming material 12 was formed in the same manner as in Example 1. A cutting operation to the outer periphery of the material 12 was conducted followed by boring the center of the material to thereby form an elongated tubular material 14 for blanks. After filling the liquid phase monomer composition 16 prepared in the same manner as Example 1, into the through hole, upper and lower opened portions were plugged with PP caps, and polymerization was conducted under the same condition as Example 1.

In the first polymerization product 22 produced in the central opening of the blank cutting-out material 14, there were found air bubbles at its central portion and a number of releasing took place. When composite-lens-forming blanks having a predetermined thickness were cut out from the material 14, good composite-lens-forming blanks free from air bubbles and releasing could not be obtained, and percentage of passing was 0%.

Comparative Example 2

A liquid phase monomer composition for optical portion 16 was prepared in the same manner as Example 1. The monomer composition were filled in a silicone-coated glass test tube having an inner diameter of 10 mm. After oxygen in the test tube was evacuated, the test tube was hermetically plugged. Then, the test tube was heated at 35° C. for 40 hours in a temperature-controlled water bath, and successively heated at 50° C. for 8 hours to conduct the polymerization of the monomer composition. Further, the test tube was placed in a hot air circulation type drier where temperature was raised to 130° C. over 20 hours to complete the polymerization. The thus obtained polymerization product was removed from the test tube, and a straightening operation was conducted by raising again temperature to 100° C. to thereby obtain an elongated rod-like material for optical portion. A cutting operation was conducted to the rod-like material so that the material having an outer diameter of 6.0 mm was obtained.

A liquid phase monomer composition for supporting portion was prepared in the same manner as Example 1. The prepared monomer composition was filled in a test tube in the same manner as Example 1, and the previously obtained rod-like material for optical portion was put in the test tube so as to place it at the axial center of the test tube with use of spacers at upper and lower positions. Then, polymerization was conducted in the same manner as Example 1. Processing of the outer diameter of the rod-like composite material wherein the supporting-portion-forming material (the second polymerization product) was formed around the rod-like material for optical portion was conducted. The composite rod-like material was cut out to produce composite-lens-forming blanks having a predetermined thickness. Processing was conducted to the blanks to prepare one-piece type intraocular lenses.

In the obtained intraocular lenses, the optical portions were deviated, and the positions of joints between the optical portion and the supporting elements were also deviated so that a symmetric relation was lost between the two supporting elements whereby a repulsive force at respective supporting elements against an external force was different. It was therefore estimated that when such intraocular lens was inserted in an eye, the supporting elements were pushed due to a shrinkage of the bladder so that the optical portion was deviated.

Table 1 summarizes percentage of passing of the composite-lens-forming blanks obtained in the above-mentioned Examples and Comparative Examples and a result of absence and presence of the deviation of optical portions in intraocular lenses produced from such composite-lens-forming blanks. As clear from the result, the composite-lens-forming blanks in Examples of the present invention show high percentage of passing and optical portions without eccentricity. Percentage of passing can further be increased to reach 100% by providing the space 8 at the opened portion of the through hole 4 in the supporting-portion-forming blank 2, in particular, by providing the space 8 having the tapered surface around the through hole.

TABLE 1

Figure 4D:
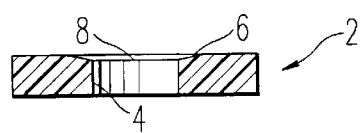

|  |  | Shape of supporting-portion-forming blanks | Percentage of passing of composite-lens-forming blanks (%) | Eccentricity of optical portions |
|---|---|---|---|---|
| Examples | 1 | Figure 4a | 30 | Absence |
|  | 2 | Figure 4a | 50 | Absence |
|  | 3 | Figure 4b | 70 | Absence |
|  | 4 | Figure 4c | 70 | Absence |
|  | 5 | Figure 4d | 80 | Absence |
|  | 6 | Figure 5a | 90 | Absence |
|  | 7 | Figure 5b | 90 | Absence |
|  | 8 | Figure 1 | 100 | Absence |
|  | 9 | Figure 6a | 100 | Absence |
|  | 10 | Figure 6b | 100 | Absence |
|  | 11 | Figure 6c | 100 | Absence |
|  | 12 | Figure 1 | 100 | Absence |
| Comparative Examples | 1 | — | 0 | — |
|  | 2 | — | — | Presence |

According to the present invention, a composite-lens-forming blank wherein a material for optical portion (a first polymerization product) formed at its center is formed integrally with a material for supporting portion (a second polymerization product) surrounding around the material for the optical portion is obtained in a correctly concentrically circular shape without any deviation. In producing such composite-lens-forming blank, generation of air bubbles or a defect of releasing due to polymerization shrinkage can effectively be suppressed. When a one-piece type intraocular lens is produced from such composite-lens-forming blank, there is no deviation of the optical portion and any shift of position of joining the supporting portions to the optical portion, i.e., two supporting elements are arranged symmetrically around the optical portion. Accordingly, repulsive forces in the supporting elements are the same, and therefore, the optical portion in an eye can correctly be positioned.

The present invention is advantageously applicable to a one-piece type intraocular lens capable of being folded in which the optical portion of a soft material is formed integrally with the supporting portion of a hard material which supports the optical portion in an eye.

What is claimed is:

1. A method for producing a one-piece intraocular lens comprising an optical portion composed of a first polymerization product and a supporting portion composed of a second polymerization product different from the first polymerization product, the supporting portion being formed integrally with the outer periphery of the optical portion, characterized by comprising:

a step of forming an annular supporting-portion-forming blank composed of the second polymerization product, which has a thickness to form the supporting portion for an intraocular lens and has a through hole formed by concentrically drilling the central portion on the basis of the outer diameter of the blank;

a step of forming a composite-lens-forming blank by filling in the through hole of the supporting-portion-forming blank a monomer composition for forming the first polymerization product, followed by polymerizing, whereby the first polymerization product is formed integrally in the through hole of the supporting-portion-forming blank; and a step of forming a one-piece type intraocular lens by processing the composite-lens-forming blank on the basis of its outer diameter so that the supporting portion is formed from a portion corresponding to the supporting-portion-forming blank in the composite-lens-forming blank, and the optical portion is formed from the first polymerization product formed in the through hole, which has been drilled in the supporting-portion-forming blank, in the composite-lens-forming blank, wherein the monomer composition for the first polymerization product is filled in the through hole of the supporting-portion-forming blank; opened portions at both ends of the through hole are covered with flexible films so as not to leave air between the monomer composition and the films: and the polymerization of the monomer composition is conducted.

2. The method for producing an intraocular lens according to claim 1, wherein the supporting-portion-forming blank is composed of the second polymerization product, and the blank is cut out from a supporting-portion-forming material having a size capable of producing a plurality of supporting portions for a plurality of intraocular lenses.

3. The method for producing an intraocular lens according to claim 1, wherein the first polymerization product provides a soft optical portion capable of being folded, and the second polymerization product provides a hard supporting portion having a sufficient rigidity to support the optical portion in an eye.

4. The method for producing an intraocular lens according to claim 1, wherein a space is formed at an opened portion of at at least one end of the through hole of the supporting-portion-forming blank to cause the deformation of the film in response to the polymerization shrinkage of the monomer composition for the first polymerization product.

5. The method for producing an intraocular lens according to claim 4, wherein the space is formed at the opened portion at both ends of the through hole of the supporting-portion-forming blank.

6. The method for producing an intraocular lens according to claim 4, wherein the total volume of the space is 5% or more of the volume of the through hole of the supporting-portion-forming blank.

7. The method for producing an intraocular lens according to claim 4, wherein the space is formed at an outer peripheral portion at an end of the through hole of the supporting-portion-forming blank in which an outwardly expanding tapered surface is provided.

8. The method for producing an intraocular lens according to claim 7, wherein the supporting-portion-forming blank has a flat surface contiguous to the tapered surface at a radically outer side of the tapered surface.

9. A method for producing a one-piece type intraocular lens comprising an optical portion composed of a first polymerization product and a supporting portion composed of a second polymerization product different from the first polymerization product, the supporting portion being formed integrally with the outer periphery of the optical portion, characterized by comprising:

a step for forming an annular supporting-portion-forming blank composed of the second polymerization product, which has a thickness to form the supporting portion for an intraocular lens and has a through hole;

a step for forming a composite-lens-forming blank by filling in the through hole of the supporting-portion-forming blank a monomer composition for forming the first polymerization product, followed by polymerizing, whereby the first polymerization product is formed integrally in the through hole of the supporting-portion-forming blank; and a step for forming a one-piece type intraocular lens from the composite-lens-forming blank wherein the monomer composition for the first polymerization product is filled in the through hole of the supporting-portion-forming blank; opened portions at both ends of the through hole are covered with flexible films so as not to leave air between the monomer composition and the films; and the polymerization of the monomer composition is conducted.

10. The method for producing an intraocular lens according to claim 9, wherein the supporting-portion-forming blank is composed of the second polymerization product, and the blank is cut out from a supporting-portion-forming material having a size capable of producing a plurality of supporting portions for a plurality of intraocular lenses.

11. The method for producing an intraocular lens according to claim 9, wherein the first polymerization product provides a soft optical portion capable of being folded, and the second polymerization product provides a hard supporting portion having a sufficient rigidity to support the optical portion in an eye.

12. The method for producing an intraocular lens according to claim 9, wherein a space is formed at an opened portion of at least one end of the through hole of the supporting-portion-forming blank to cause the deformation of the film in response to the polymerization shrinkage of the monomer composition for the first polymerization product.

13. The method for producing an intraocular lens according to claim 12, wherein the space is formed at the opened portion at both ends of the through hole of the supporting-portion-forming blank.

14. The method for producing an intraocular lens according to claim 12, wherein the total volume of the space is 5% or more of the volume of the through hole of the supporting-portion-forming blank.

15. The method for producing an intraocular lens according to claim 12, wherein the space is formed at an outer peripheral portion at an end of the through hole of the supporting-portion-forming blank in which an outwardly expanding tapered surface is provided.

16. The method for producing an intraocular lens according to claim 12, wherein the supporting-portion-forming blank has a flat surface contiguous to the tapered surface at a radically outer side of the tapered surface.

17. A method for producing a one-piece type intraocular lens comprising an optical portion composed of a first polymerization product and a supporting portion composed of a second polymerization product different from the first polymerization product, the supporting portion being formed integrally with the outer periphery of the optical portion, characterized by comprising:

a step of forming a composite-lens-forming blank by filling in a through hole of a supporting-portion-forming blank a monomer composition for forming the first polymerization product, followed by polymerizing, whereby the first polymerization product is formed integrally in the through hole of the supporting-portion-forming blank; and a step of forming a one-piece type intraocular lens by processing the composite-lens-forming blank on the basis of its outer diameter so that the supporting portion is formed from a portion corresponding to the supporting-portion-forming blank in the composite-lens-forming blank, and the optical portion is formed from the first polymerization product formed in the through hole, which has been drilled in the supporting-portion-forming blank, in the composite-lens-forming blank, wherein the monomer composition for the first polymerization product is filled in the through hole of the supporting-portion-forming blank; opened portions at both ends of the through hole are covered with flexible films so as not to leave air between the monomer composition and the films; and the polymerization of the monomer composition is conducted.

* * * * *